A. HECKMAN.
REGULATOR SYSTEM.
APPLICATION FILED JAN. 16, 1920.
1,437,142.
Patented Nov. 28, 1922.
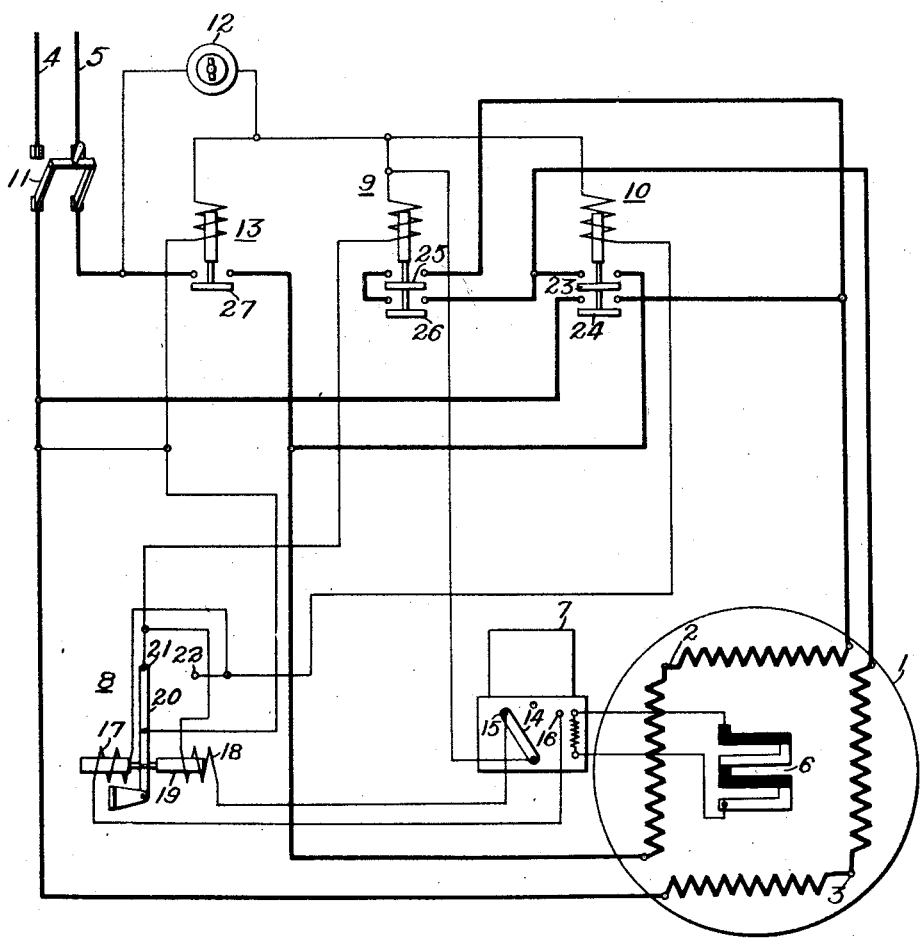
WITNESSES:
J. C. Helsel
W. B. Wells
INVENTOR
August Heckman.
BY
Wesley G. Carr
ATTORNEY Patented Nov. 28, 1922.

1,437,142

UNITED STATES PATENT OFFICE.

AUGUST HECKMAN, OF WILKINSBURG, PENNSYLVANIA, ASSIGNOR TO WESTINGHOUSE ELECTRIC AND MANUFACTURING COMPANY, A CORPORATION OF PENNSYLVANIA.

REGULATOR SYSTEM.

Application filed January 16, 1920. Serial No. 351,816.

To all whom it may concern:

Be it known that I, AUGUST HECKMAN, a citizen of the United States, and a resident of Wilkinsburg, in the county of Allegheny and State of Pennsylvania, have invented a new and useful Improvement in Regulator Systems, of which the following is a specification.

My invention relates to regulator systems and particularly to regulator systems for governing the temperature of electrically-heated devices.

One object of my invention is to provide a solder pot with a regulator system that shall be simple and inexpensive in construction and that shall automatically control the temperature of the solder pot.

In large manufacturing establishments, such, for example, as an electric factory where molten solder is constantly being used, considerable trouble is experienced in maintaining the molten solder at a proper temperature. When the solder is heated by a gas, oil or coal fire, constant attention is required to maintain its temperature within proper limits.

In a regulator system constructed in accordance with my invention, each solder pot is electrically heated and the system is automatically controlled to maintain the temperature of the solder substantially constant. The system comprises a plurality of heating coils, switches for connecting the coils, in various circuit relations, to a supply circuit and means, comprising a thermal element, for so controlling the switches as to govern the temperature of the solder.

The single figure of the accompanying drawing is a diagrammatic view of a regulator system embodying my invention.

Referring to the drawing, a solder pot 1 is electrically heated by two elements 2 and 3 which may be connected, either in series or in parallel-circuit relation, to a supply circuit comprising conductors 4 and 5. A thermal regulator, comprising a thermal couple 6 and a relay device 7, is provided for operating a transfer switch 8 in accordance with the temperature obtaining in the solder pot. The transfer switch 8 selectively controls two switches 9 and 10. A suitable switch 11 is provided for connecting the regulator system to the supply circuit, and a snap switch 12 is provided for controlling a main switch 13.

The thermal couple 6, which may be of any suitable construction, operates the relay device 7 in accordance with the temperature obtaining in the solder pot. The relay device 7, which may be of any suitable construction, controls the transfer switch 8 in accordance with the operation of the thermal couple 6. Inasmuch as my invention does not reside in the construction of the relay device 7 or the thermal couple 6, it is deemed unnecessary to completely describe and illustrate such devices which are now standard commercial products. The relay device 7 is provided with a contact arm 14 which engages the contact member 15 when the molten solder is below normal temperature and engages contact member 16 when the molten solder is above normal temperature.

The transfer switch 8 comprises two energizing coils 17 and 18 which operate upon a core armature 19 and a switch arm 20 which is controlled by the core armature 19. The switch arm 20 is adapted to selectively engage two contact members 21 and 22.

The switch 10 comprises two switch members 23 and 24 which are closed when it is desired to connect the heating elements 2 and 3, in parallel-circuit relation, across the supply conductors 4 and 5. The switch 9 comprises two switch members 25 and 26 which serve to connect the two heating elements 2 and 3 in series relation across the supply conductors 4 and 5.

Assuming the transfer switch 8 and the relay device 7 to be in the positions illustrated, it is only necessary to close the switch 11 and the snap switch 12 if it is desired to operate the system for heating the solder pot. Upon the closing of the switch 11, the heating element 3 is directly connected to the supply conductor 4 and, upon the closing of the snap switch 12, a circuit is completed from the supply conductor 5, through the energizing coil of the switch 13, to supply conductor 4. The switch 13 is operated for connecting the heating element 2 directly to the supply conductor 5. The snap switch 12 also completes a circuit from the supply conductor 4, through switch 12, contact arm 14, contact member 15, coil 18, contact member 21 and the contact arm 20, to the supply conductor 4. The coil 18 is energized and the contact arm 20 is moved into engagement with the contact member 22. Thereupon, a circuit is completed from the supply conductor 5, through the switch 12, energizing coil of the switch 10, contact member 22 and the switch arm 20, to the supply conductor 4. The switch 10 is operated and the heating elements 2 and 3 are respectively connected to the supply conductors 4 and 5 by means of the switch members 24 and 23. Thus, the heating elements 2 and 3 are connected, in parallel-circuit relation, across the supply conductors 4 and 5, and the solder pot 1 is rapidly heated to any desired temperature.

When the temperature of the solder pot is raised above a normal value, the contact arm 14 is moved into engagement with the contact member 16. Thereupon, a circuit is completed from the supply conductor 5, through the switch 12, contact arm 14, contact member 16, coil 17, contact member 22 and the contact arm 20, to the supply conductor 4. The switch arm 20 is moved into engagement with the contact member 21 for completing a circuit through the energizing coil of the switch 9. When the contact arm 20 is disconnected from the contact member 22, the switch 10 is released to break the parallel-circuit connection of the heating elements 2 and 3 to the supply conductors 4 and 5.

The switch 9 operates the switch members 25 and 26 to connect the heating elements 2 and 3, in series-circuit relation, across the supply conductors. The circuit through the heating elements extends from the supply conductor 4, through the heating element 3, switch member 26, switch member 25, heating element 2 and the switch 13, to the supply conductor 5. Thereupon, the temperature of the solder pot is reduced to normal value and, if the temperature is reduced substantially below normal value, the relay device 7 energizes the coil 18 to again connect the heating elements 2 and 3, in parallel-circuit relation, across the supply conductors. The above condition is maintained, while the solder pot is in operation, to maintain the solder at a substantially constant temperature.

Modifications in the system and in the arrangement and location of parts may be made within the spirit and scope of my invention, and such modifications are intended to be covered by the appended claims.

I claim as my invention:

1. In a regulator system for an electrically-heated device, the combination with a plurality of heating elements for said device, and switches for connecting said elements in parallel-circuit and in series-circuit relation to a supply circuit, of a thermal unit operated in accordance with the temperature of said device, a relay controlled by said unit, and means governed by said relay for selectively operating said switches to maintain the temperature of said device substantially constant.

2. In a regulator system for a solder pot, the combination with a plurality of heating elements and a plurality of switches for connecting said elements in various circuit relations to a supply circuit, of a thermal couple operated in accordance with the temperature of the solder pot, and means controlled by said thermal couple for selectively operating said switches.

3. In a regulator system for an electrically-heated device, the combination with a plurality of heating elements and switches for respectively connecting said heating elements in parallel-circuit and in series-circuit relation to a supply circuit, of a thermal unit operated in accordance with the temperature of said device, and means governed by said thermal couple for selectively operating said switches.

In testimony whereof, I have hereunto subscribed my name this 29th day of December 1919.

AUGUST HECKMAN.